(12) United States Patent
Nakakura

(10) Patent No.: US 9,751,586 B2
(45) Date of Patent: Sep. 5, 2017

(54) CABLE DISK BRAKE WITH BRAKE PAD CLEARANCE ADJUSTMENT MECHANISM

(75) Inventor: Masahiro Nakakura, Sakai (JP)

(73) Assignee: Shimano, Inc., Sakai, Osaka (JP)

( * ) Notice: Subject to any disclaimer, the term of this patent is extended or adjusted under 35 U.S.C. 154(b) by 601 days.

(21) Appl. No.: 13/088,729

(22) Filed: Apr. 18, 2011

(65) Prior Publication Data

US 2012/0261219 A1    Oct. 18, 2012

(51) Int. Cl.
| | |
|---|---|
| F16D 51/00 | (2006.01) |
| B62L 1/00 | (2006.01) |
| F16D 65/50 | (2006.01) |
| F16D 55/224 | (2006.01) |
| B60T 11/04 | (2006.01) |
| F16D 65/42 | (2006.01) |
| F16D 121/14 | (2012.01) |
| F16D 125/36 | (2012.01) |

(52) U.S. Cl.
CPC ............... B62L 1/00 (2013.01); B60T 11/046 (2013.01); F16D 55/224 (2013.01); F16D 65/50 (2013.01); F16D 65/42 (2013.01); F16D 2121/14 (2013.01); F16D 2125/36 (2013.01)

(58) Field of Classification Search
CPC .......... F16D 65/50; F16D 65/40; F16D 65/42; F16D 65/46; B62L 3/00; B62L 3/02; B62L 1/10
USPC ....... 188/24.19, 24.22, 2 D, 71.7, 72.7, 72.8, 188/72.9, 196 R, 196 M, 196 V
See application file for complete search history.

(56) References Cited

U.S. PATENT DOCUMENTS

| | | | | |
|---|---|---|---|---|
| 1,609,527 | A | * | 12/1926 | Moorhouse .................... 188/194 |
| 1,774,527 | A | * | 9/1930 | Sanford ....................... 188/79.55 |
| 2,001,239 | A | * | 5/1935 | Buckendale ............. 188/196 M |
| 2,015,881 | A | * | 10/1935 | Alden et al. ............. 188/196 M |
| 2,922,317 | A | * | 1/1960 | House ............................. 74/522 |
| 3,878,921 | A | * | 4/1975 | Kibler et al. .................... 188/26 |
| 4,029,179 | A | | 6/1977 | Butz |
| 4,061,208 | A | | 12/1977 | Nishiyama |
| 5,009,292 | A | * | 4/1991 | Hoffman et al. ............. 188/71.7 |
| 5,020,643 | A | * | 6/1991 | Redenbarger ............. 188/196 M |
| 5,495,920 | A | * | 3/1996 | Tsuyoshi .................... 188/24.22 |
| 5,979,609 | A | * | 11/1999 | Tsai ................................ 188/26 |
| 6,230,850 | B1 | * | 5/2001 | Huang ........................ 188/24.21 |
| 6,607,057 | B2 | | 8/2003 | Lumpkin et al. |
| 6,684,982 | B2 | | 2/2004 | Kariyama |

(Continued)

*Primary Examiner* — Nicholas J Lane
(74) *Attorney, Agent, or Firm* — James A. Deland

(57) ABSTRACT

A cable disk brake apparatus comprises a caliper housing structured to be attached to a bicycle, a first brake pad coupled to the caliper housing for movement between a release position and a braking position, and a second brake pad coupled to the caliper housing and arranged facing the first brake pad. A drive shaft is coupled to the caliper housing, wherein the drive shaft rotates around a drive shaft axis to move the first brake pad in an axial direction from the release position towards the braking position. An actuating member rotates to communicate rotational force to the drive shaft to cause the drive shaft to move the first brake pad from the release position towards the braking position, and a drive coupling member is coupled to the drive shaft to communicate rotational force from the actuating member to the drive shaft. An adjusting member adjusts a position of the drive coupling member relative to the actuating member.

31 Claims, 4 Drawing Sheets

(56) References Cited

U.S. PATENT DOCUMENTS

RE42,635 E * 8/2011 Kirimoto et al. ............... 188/26
2002/0175030 A1* 11/2002 Lee ........................... 188/73.31

* cited by examiner

CABLE DISK BRAKE WITH BRAKE PAD
CLEARANCE ADJUSTMENT MECHANISM

BACKGROUND OF THE INVENTION

The present invention is directed to disk brake devices and, more particularly, to a bicycle cable disk brake with a brake pad clearance adjustment mechanism.

Disk brake assemblies for bicycles and other vehicles are well known. A typical disk brake assembly comprises a brake disk mounted to a hub that rotates together with bicycle wheel. A caliper is mounted over the edge of the brake disk, wherein the caliper supports first and second brake pads that straddle the brake disk. During operation, the first and second brake pads frictionally contact opposite sides of the brake disk to stop rotation of the brake disk and the bicycle wheel.

The first and second brake pads need to be spaced apart by a sufficient distance to receive the brake disk between them, but the brake pads also should be only slightly spaced apart from the brake disk when the brake system is in the non-operating state so that the brake pads quickly contact the brake disk during a braking operation. However, as the brake pads and/or the brake disk wear, the spacing between the brake pads and the brake disk may increase to an undesirable level. Thus, it is desirable to have some mechanism to adjust the clearance between the brake pads and the brake disk.

SUMMARY OF THE INVENTION

The present invention is directed to various features of a disk brake apparatus. In one embodiment, a cable disk brake apparatus comprises a caliper housing structured to be attached to a bicycle, a first brake pad coupled to the caliper housing for movement between a release position and a braking position, and a second brake pad coupled to the caliper housing and arranged facing the first brake pad. A drive shaft is coupled to the caliper housing, wherein the drive shaft rotates around a drive shaft axis to move the first brake pad in an axial direction from the release position towards the braking position. An actuating member rotates to communicate rotational force to the drive shaft to cause the drive shaft to move the first brake pad from the release position towards the braking position, and a drive coupling member is coupled to the drive shaft to communicate rotational force from the actuating member to the drive shaft. An adjusting member adjusts a position of the drive coupling member relative to the actuating member. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
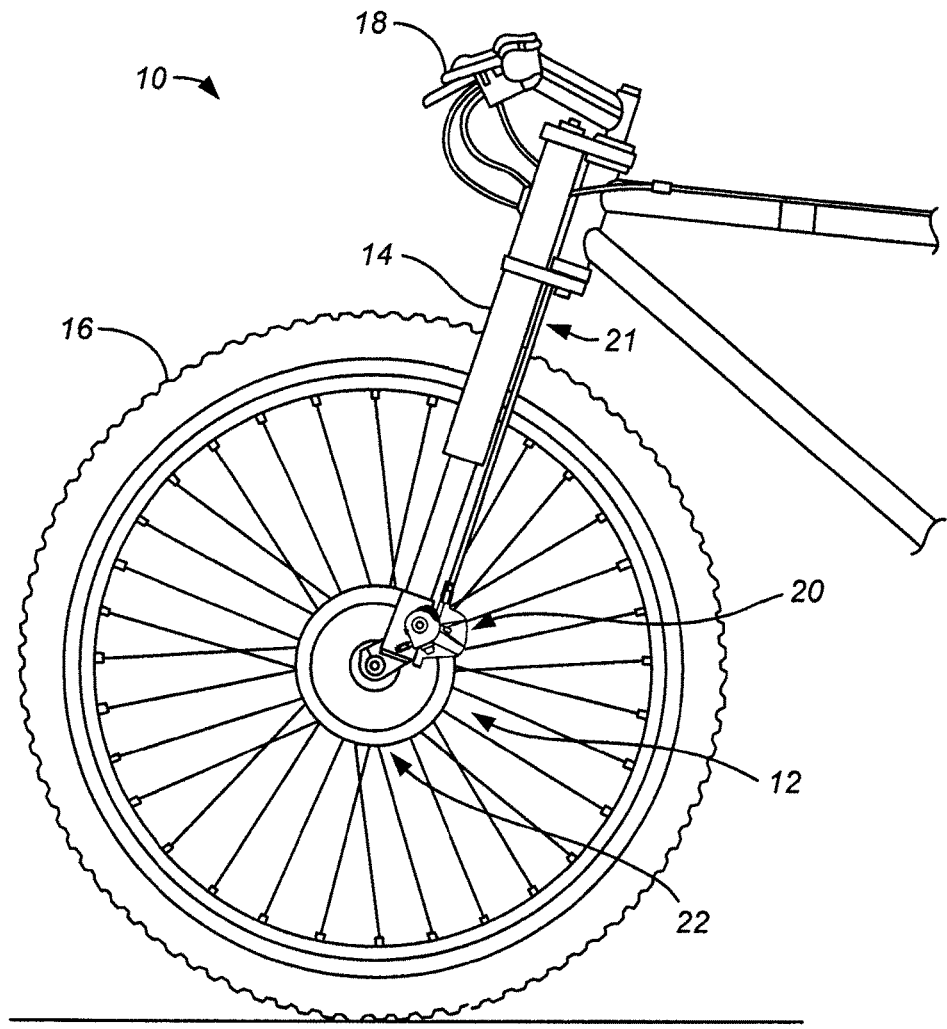
FIG. 1 is a side view of a front portion of a bicycle that employs an embodiment of a disk brake assembly.

FIG. 1 is a side view of a particular embodiment of a bicycle 10. Bicycle 10 includes a disk brake assembly 12 coupled to a front fork 14 for selectively stopping the rotation of a wheel 16. Disk brake assembly 12 includes a brake lever 18, a disk brake caliper 20 operatively coupled to brake lever 18 through a Bowden cable 21, and a brake disk 22. Disk brake caliper 20 is fixedly coupled to fork 14 of bicycle 10, while brake disk 22 is fixedly coupled to a hub (not shown) of wheel 16 in a well-known manner. Disk brake caliper 20 applies a clamping force to brake disk 22 in response to the operation of brake lever 18 to stop rotation of bicycle wheel 16.

Figure 2:
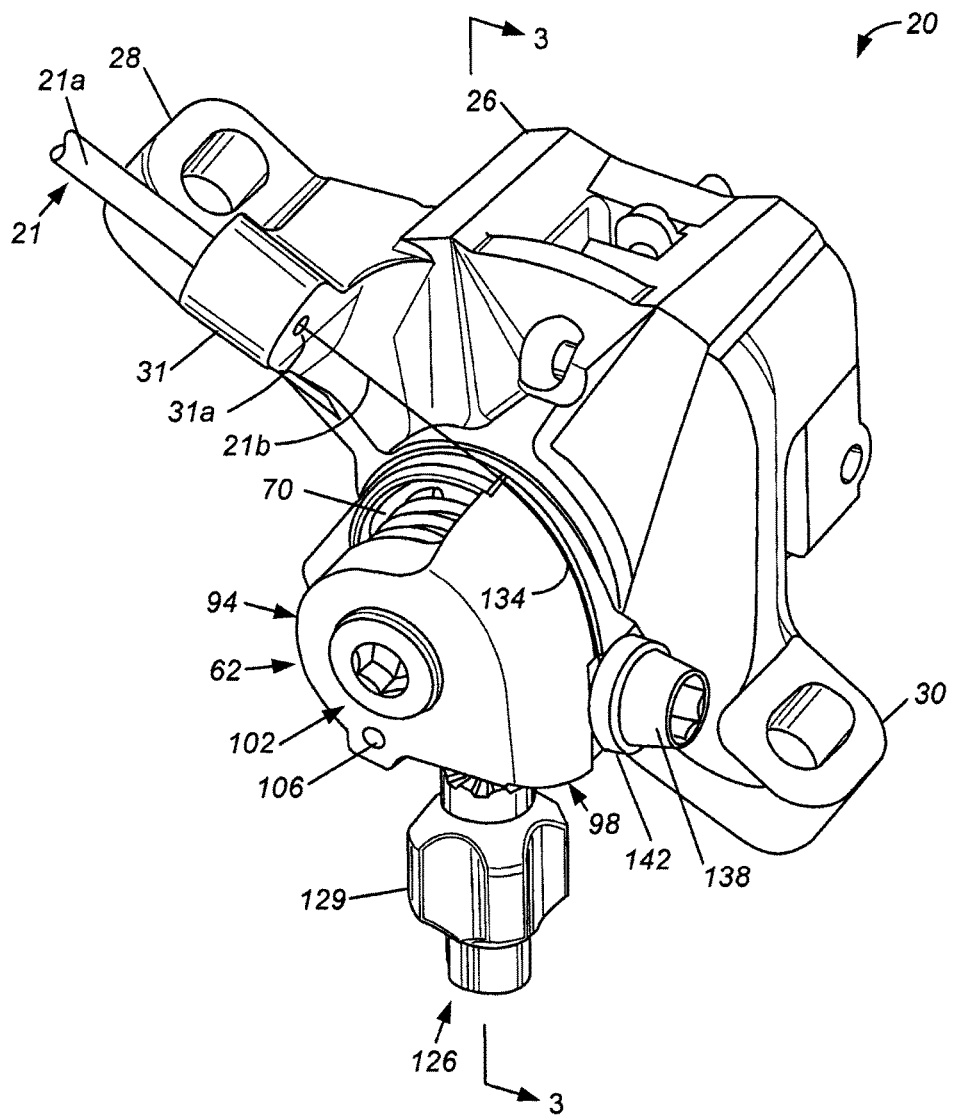
FIG. 2 is a perspective view of an embodiment of a disk brake caliper.
Figure 3:
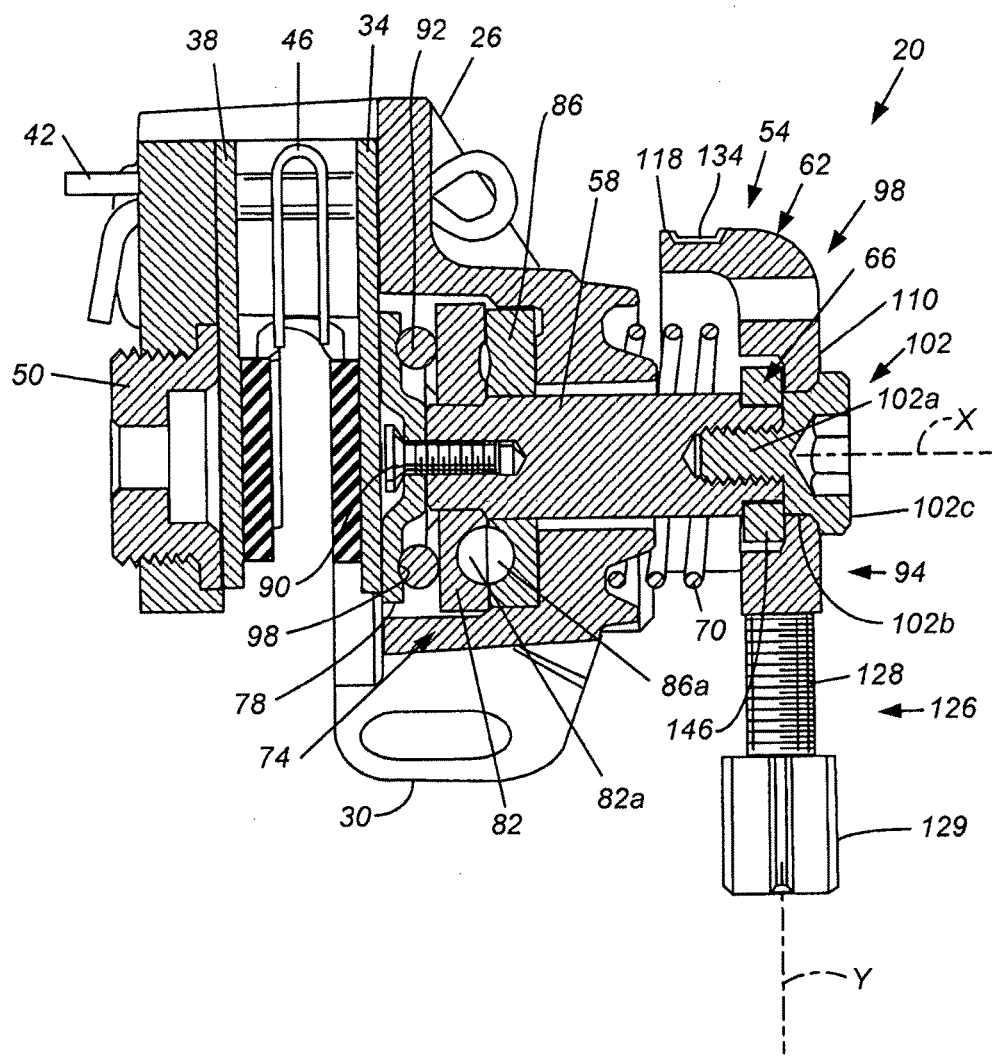
FIG. 3 is a cross-sectional view of the disk brake caliper taken along line FIG. 2.

As shown in FIGS. 2 and 3, disk brake caliper 20 includes a caliper housing 26 with mounting ears 28 and 30 for mounting caliper housing 26 to front fork 14 in a well-known manner. A casing terminating boss 31 with an inner cable passage 31a is formed adjacent to mounting flange 28 for terminating the outer casing 21a of Bowden cable 21 while allowing inner cable 21b of Bowden cable 21 to pass therethrough. A first brake pad 34 is coupled to caliper housing 26 for movement between a release position and a braking position, and a second brake pad 38 coupled to caliper housing 26 and arranged substantially parallel to first brake pad 34 to form a brake disk receiving slot therebetween. In this embodiment, upper portions of first brake pad 34 and second brake pad 38 are slidably supported on a support shaft 42 in the form of a cotter pin. A brake pad return spring 46 is disposed between first brake pad 34 and second brake pad 38 to bias first brake pad 34 and second brake pad 38 apart from each other. A second brake pad backing cup 50 is mounted to the inner side of caliper housing 26 for stably supporting second brake pad 38 in the axial direction.

An actuating assembly 54 is rotatably coupled to caliper housing 26 for moving first brake pad 34 axially towards second brake pad 38. Actuating assembly 54 comprises a drive shaft 58 coupled to caliper housing 26 for rotation around a drive shaft axis X, an actuating member which, in this embodiment, is in the form of an actuating arm 62 that rotates coaxially around drive shaft axis X to communicate rotational force to drive shaft 58, a drive coupling member 66 coupled to drive shaft 58 to communicate rotational force from actuating arm 62 to drive shaft 58, a biasing mechanism in the form of an actuating arm return spring 70 for biasing actuating arm 62 to a home position relative to caliper housing 26, a cam assembly 74 that converts rotational movement of drive shaft 58 into axial movement, and a first brake pad backing cup 78 for stably supporting first brake pad 34 in the axial direction.

Cam assembly 74 comprises an annular first cam member 82 and an annular second cam member 86. First cam member 82 and second cam member 86 have a conventional structure such as that disclosed in U.S. Pat. No. 6,684,982. More specifically, first cam member 82 includes a plurality of circumferentially-distributed and circumferentially-extending first cam ramps 82a, and second cam member 86 includes a plurality of circumferentially-distributed and circumferentially-extending second cam ramps 86a, wherein each first cam ramp 82a faces a corresponding second cam ramp 86a. A ball bearing (not shown) is disposed between each pair of facing first and second cam ramps 82a and 86a. Each first and second cam ramp 82a and 86a inclines axially and circumferentially so that first cam member 82 moves axially away from second cam member 86 when first cam member 82 rotates in one direction relative to second cam member 86 (e.g., counterclockwise in FIG. 2), and first cam member 82 moves axially back towards second cam member 86 when first cam member 82 rotates in the opposite direction relative to second cam member 86 (clockwise). In this embodiment, first cam member 82 is fixed to drive axle 58, and second cam member 86 is fixed to caliper housing 26. Thus, first cam member 82 rotates relative to stationary second cam member 86 when drive axle 58 rotates.

First brake pad backing cup 78 is attached to drive axle 58 through a mounting bolt 90. A plurality of ball bearings 92 are circumferentially distributed and fitted in corresponding detents 98 in first brake pad bearing cup 78 so that the plurality of ball bearings 92 are disposed between first brake pad bearing cup 78 and first cam member 82. As a result, first brake pad backing cup 78 is stably supported in the axial direction.

As shown in FIGS. 2-5, actuating arm 62 comprises a base portion 94 and a cable supporting portion 98. Base portion 94 is axially fixed to drive shaft 58 through a bushing bolt 102. As shown in FIG. 3, bushing bolt 102 includes a threaded shaft portion 102a that screws into the axial end of drive shaft 58, a bushing portion 102b that rotatably supports base portion 94 of actuating arm 62, and a head portion 102c that axially fixes base portion 94 of actuating arm 62 to drive shaft 58. As a result, actuating arm 62 is axially fixed relative to drive shaft 58 but is capable of rotation relative to drive shaft 58 coaxially around drive shaft axis X. Base portion 94 of actuating arm 62 includes an opening 106 (FIG. 2) for receiving one end of actuating arm return spring 70 therein. The other end of actuating arm return spring 70 is inserted into an opening (not shown) in caliper housing 26 so that actuating arm 62 is biased to the home position.

Figure 4:
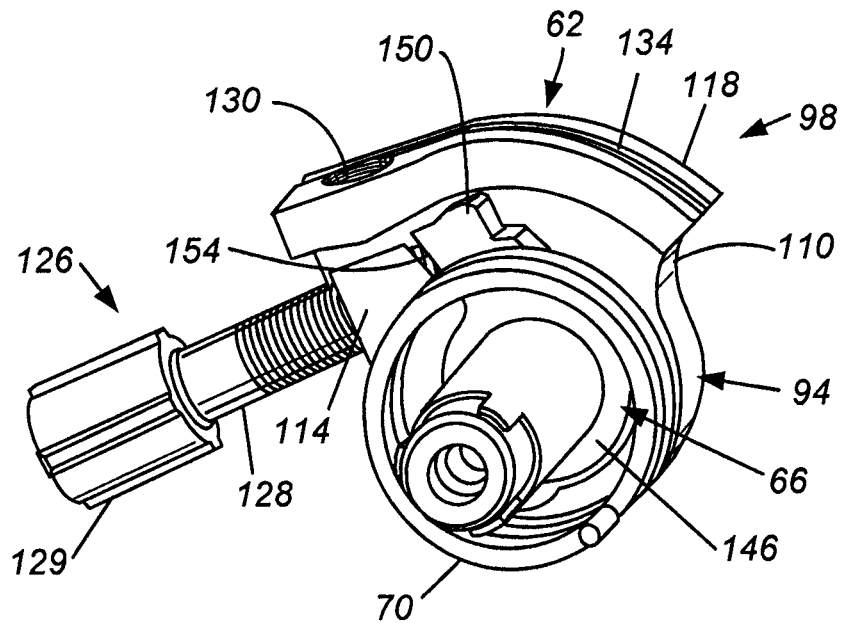
FIG. 4 is an inner side view of the actuating member showing a drive coupling member in a first angular position relative to the actuating member.
Figure 5:
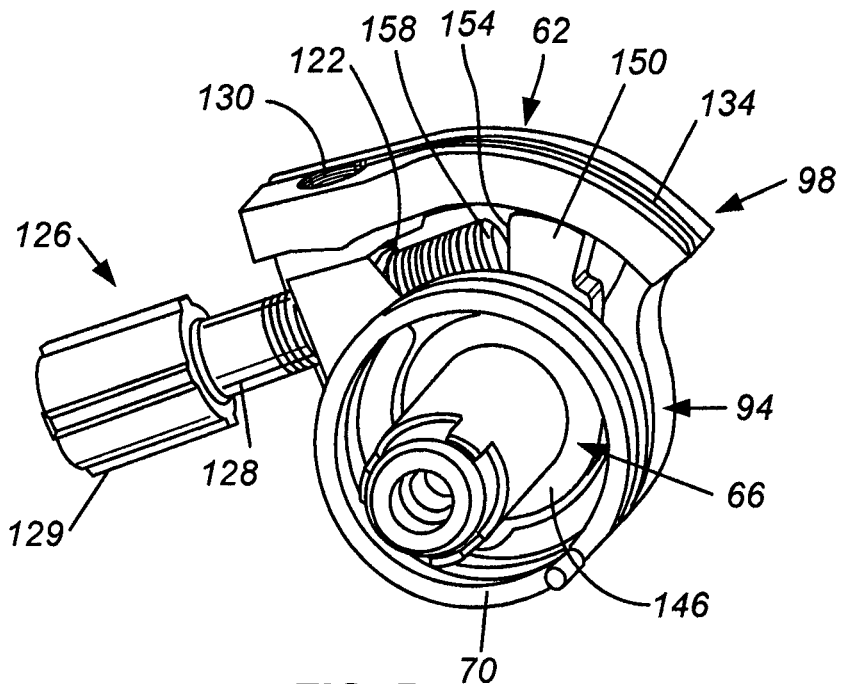
FIG. 5 is an inner side view of the actuating member showing the drive coupling member in a second angular position relative to the actuating member.

As shown in FIGS. 3-5, cable supporting portion 98 comprises a radially-outwardly extending lateral side wall 110, a radially-outwardly extending circumferential side wall 114, and an arcuate cable supporting platform 118. Circumferential side wall 114 includes a threaded opening 122 (FIG. 5) for receiving an adjusting member in the form of an adjusting screw 126 therethrough. Adjusting screw 126 includes a threaded shaft portion 128 and a manually-operated knob portion 129, wherein threaded shaft portion 128 screws into threaded opening 122. Adjusting screw 126 is carried by actuating arm 62 and rotates around an adjusting axis Y that is non-parallel, and preferentially perpendicular or substantially perpendicular to, drive shaft axis X.

Cable supporting platform 118 includes a threaded opening 130 at a first circumferential end and a cam-shaped cable-receiving groove 134 that extends from threaded opening 130 to the other circumferential end. Threaded opening 130 receives cable attachment bolt 138 (FIG. 2) therein so that inner wire 21b of Bowden cable 21 may be fastened to cable supporting platform 118 by a cable fixing washer 142. Cable-receiving groove 134 supports inner wire 21b of Bowden cable 21 thereon. Cable supporting platform 118 and/or cable-receiving groove 134 circumferentially varies in radial height to provide whatever rate of rotation of actuating arm 62 per unit of cable pull is desired for the particular application.

As shown in FIGS. 4-5, drive coupling member 66 includes a base portion 146 and a radially extending portion 150. In this embodiment, base portion 146 is spline-connected to drive shaft 58 so that drive shaft 58 and drive coupling member 66 rotate together as a unit. Radially-extending portion 150 has a side surface 154 that contacts a tip 158 of adjusting screw 126. As a result, the angular position of drive coupling member 66, and hence drive shaft 58, relative to actuating arm 62 may be adjusted in a continuous manner by rotating adjusting screw 126.

In operation, inner wire 21b of Bowden cable 21 is attached to the first circumferential end of cable supporting platform 118 using cable attachment bolt 138 and cable fixing washer 142, and inner wire 21b is placed within cable-receiving groove 134. When inner wire 21b of Bowden cable 21 is pulled by the operation of brake lever 18, actuating arm 62 rotates counterclockwise in FIG. 2 (clockwise in FIGS. 4 and 5). As a result, the tip 158 of adjusting screw 126 presses against circumferential side surface 154 of drive coupling member 66 so that actuating arm 62 engages circumferential side surface 154 of drive coupling member 66, thereby rotating drive shaft 58 and first cam member 82. When first cam member 82 rotates relative to the stationary second cam member 86, first cam ramps 82a, second cam ramps 86a and the ball bearings between them cause first cam member 82, first brake pad backing cup 78 and first brake pad 34 to move axially to the left in FIG. 3, thereby causing first brake pad 34 and second brake pad 38 to frictionally contact brake disk 22.

If it is desired to reduce the clearance between first brake pad 34 and brake disk 38, adjusting screw 126 is screwed into circumferential side wall 114 of actuating arm 62 by simply manually rotating knob 129 so that the angular position of drive coupling member 66 relative to actuating arm 62 is adjusted from the position shown in FIG. 4 to the position shown in FIG. 5. As a result, drive coupling member 66, drive shaft 58 and first cam member 82 rotate (counterclockwise in FIG. 2, clockwise in FIGS. 4 and 5) relative to the stationary second cam member 86. First cam ramps 82a, second cam ramps 86a and the ball bearings between them cause first cam member 82, first brake pad backing cup 78 and first brake pad 34 to move axially to the left in FIG. 3, thereby reducing the clearance between first brake pad 34 and brake disk 22 without requiring the use of tools.

If it is desired to increase the clearance between first brake pad 34 and brake disk 38, adjusting screw 126 is screwed outwardly from circumferential side wall 114 of actuating arm 62 so that the angular position of drive coupling member 66 relative to actuating arm 62 is adjusted from the position shown in FIG. 5 to the position shown in FIG. 4. As a result, drive coupling member 66, drive shaft 58 and first cam member 82 rotate relative to the stationary second cam member 86 in the opposite direction. First cam ramps 82a, second cam ramps 86a and the ball bearings between them cause first cam member 82, first brake pad backing cup 78 and first brake pad 34 to move axially to the right in FIG. 3, thereby increasing the clearance between first brake pad 34 and brake disk 22.

While the above is a description of various embodiments of inventive features, further modifications may be employed without departing from the spirit and scope of the present invention. For example, the size, shape, location or orientation of the various components may be changed as desired. Adjusting screw 126, and hence adjusting axis Y, may be oriented as desired for the particular application. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. Thus, the scope of the invention should not be limited by the specific structures disclosed or the apparent initial focus or emphasis on a particular structure or feature.

What is claimed is:

1. A disk brake apparatus for a bicycle comprising:
   a caliper housing structured to be attached to a bicycle;
   a first brake pad coupled to the caliper housing for movement between a release position and a braking position;
   a second brake pad coupled to the caliper housing and arranged facing the first brake pad;
   a drive shaft coupled to the caliper housing, wherein the drive shaft rotates around a drive shaft axis to move the first brake pad in an axial direction from the release position towards the braking position;
   an actuating member that rotates to communicate rotational force to the drive shaft to cause the drive shaft to move the first brake pad from the release position towards the braking position;
   a drive coupling member coupled to the drive shaft to communicate rotational force from the actuating member to the drive shaft;
   an adjusting member that adjusts a position of the drive coupling member relative to the actuating member; and
   a biasing mechanism that biases the actuating member relative to the caliper housing;
   wherein the actuating member, the drive coupling member, and the adjusting member move together when the actuating member rotates to communicate rotational force to the drive shaft;
   wherein the actuating member can remain stationary when the adjusting member adjusts the position of the drive coupling member relative to the actuating member;
   wherein the actuating member can be removed from the drive shaft while leaving the drive coupling member connected to the drive shaft; and
   wherein the adjusting member is unconstrained in the direction of the drive shaft axis by the drive coupling member when the drive coupling member is in its adjusted position.

2. The apparatus according to claim 1 wherein the drive coupling member is nonrotatably coupled to the drive shaft.

3. The apparatus according to claim 1 wherein the drive coupling member extends radially outwardly from the drive shaft.

4. The apparatus according to claim 3 wherein the actuating member engages a circumferential side of the drive coupling member to communicate rotational force to the drive coupling member.

5. The apparatus according to claim 4 wherein the adjusting member is carried by the actuating member.

6. The apparatus according to claim 5 wherein the adjusting member is disposed on a circumferential side of the actuating member.

7. The apparatus according to claim 6 wherein the adjusting member adjusts the position of the drive coupling member relative to the actuating member in a continuous manner.

8. The apparatus according to claim 7 wherein the adjusting member comprises an adjusting screw.

9. The apparatus according to claim 8 wherein the adjusting member rotates around an adjusting axis that is non-parallel to the drive shaft axis.

10. The apparatus according to claim 9 wherein the adjusting member includes a manually operable knob so that the adjusting screw can be manually rotated without tools.

11. The apparatus according to claim 1 wherein the adjusting member rotates around an adjusting axis.

12. The apparatus according to claim 11 wherein the adjusting axis is non-parallel to the drive shaft axis.

13. The apparatus according to claim 12 wherein the adjusting axis is substantially perpendicular to the drive shaft axis.

14. The apparatus according to claim 12 wherein the actuating member rotates around the drive shaft axis.

15. The apparatus according to claim 14 wherein the actuating member rotates coaxially around the drive shaft axis.

16. The apparatus according to claim 11 further comprising:
   a first cam member rotated by the drive shaft; and
   a second cam member;
   wherein at least one of the first cam member or the second cam member moves axially in response to rotation of the first cam member to move the first brake pad in the axial direction.

17. The apparatus according to claim 16 wherein the drive shaft is nonrotatably fixed to the first cam member.

18. The apparatus according to claim 17 wherein the drive coupling member extends radially outwardly from the drive shaft, and wherein the actuating member engages a circumferential side of the drive coupling member to communicate rotational force to the drive coupling member.

19. The apparatus according to claim 18 wherein the adjusting axis is non-parallel to the drive shaft axis.

20. The apparatus according to claim 19 wherein the adjusting member adjusts the position of the drive coupling member relative to the actuating member in a continuous manner.

21. The apparatus according to claim 1 wherein the drive coupling member is not clamped to the adjusting member.

22. The apparatus according to claim 1 wherein the biasing mechanism does not clamp the drive coupling member to the adjusting member.

23. The apparatus according to claim 1 wherein the drive coupling member and the adjusting member are not fastened together.

24. The apparatus according to claim 1 wherein the adjusting member does not extend through the drive coupling member.

25. The apparatus according to claim 1 wherein the actuating arm is unconstrained in the direction of the drive shaft axis by the drive coupling member when the drive coupling member is in its adjusted position.

26. The apparatus according to claim 1 wherein the adjusting member is mounted to the actuating member.

27. The apparatus according to claim 1 wherein the drive coupling member is movable away from the adjusting member while the actuating arm is stationary.

28. The apparatus according to claim 1 wherein the adjusting member is mounted to the actuating member so that the actuating member and the adjusting member can be removed together as a unit from the drive shaft while leaving the drive coupling member connected to the drive shaft.

29. The apparatus according to claim 28 wherein the adjusting member comprises a screw fastened to the actuating member.

30. The apparatus according to claim 29 wherein the adjusting member remains fastened to the actuating member when the actuating member and the adjusting member are removed from the drive shaft.

31. The apparatus according to claim 1 wherein the adjusting member is unconstrained in the direction of the drive shaft axis by the drive coupling member when the drive coupling member is in its adjusted position and the drive coupling member is connected to the drive shaft.

* * * * *